Dec. 25, 1934.　　　　S. B. FIELD　　　　1,985,821
MACHINE FOR FORMING RUBBER ARTICLES
Filed Oct. 6, 1932　　　5 Sheets-Sheet 5
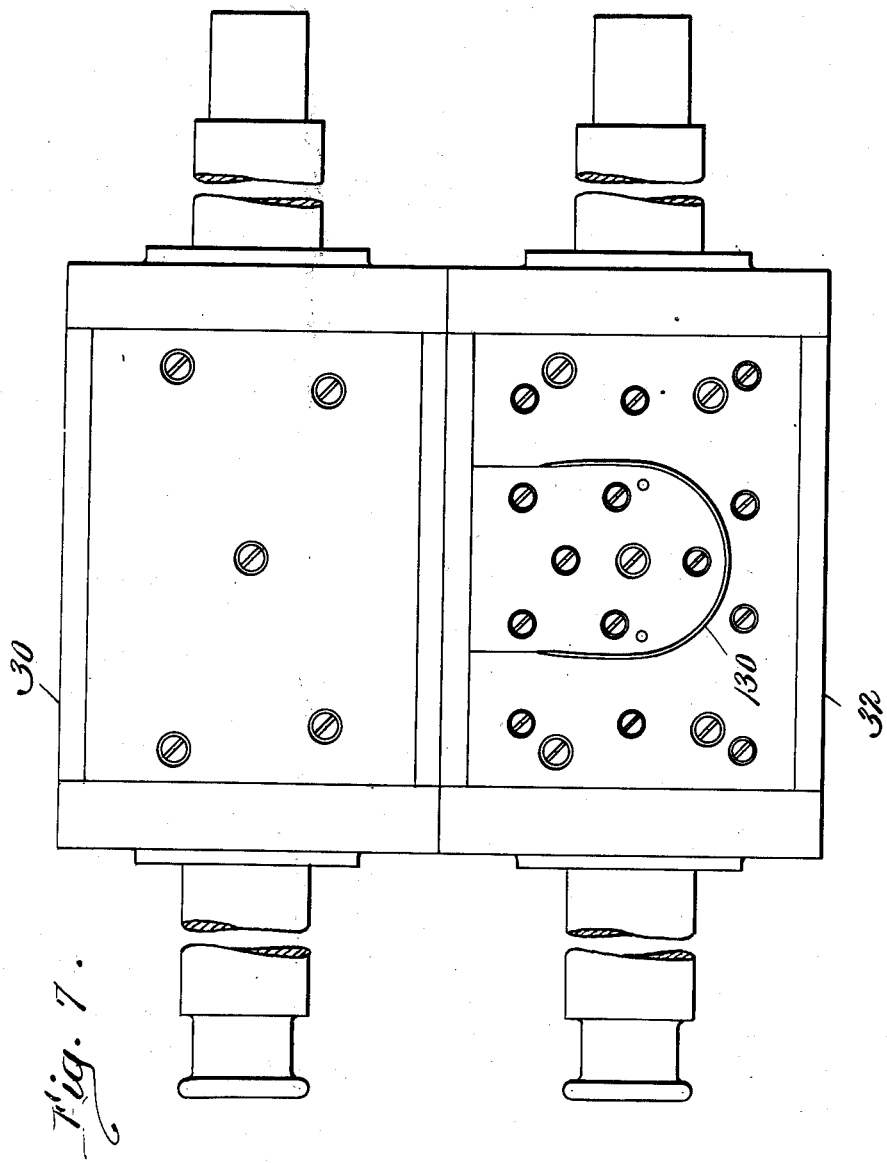

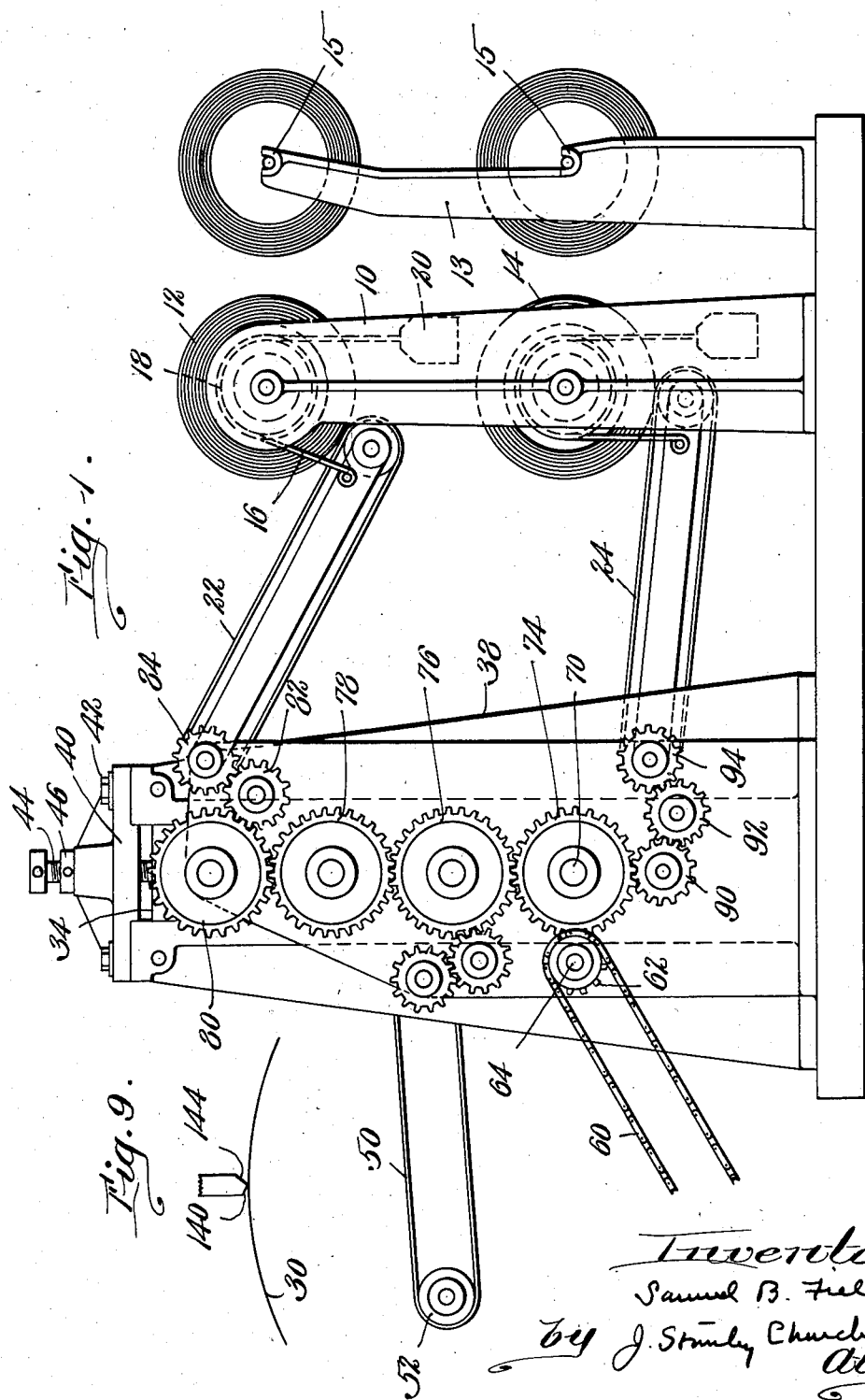

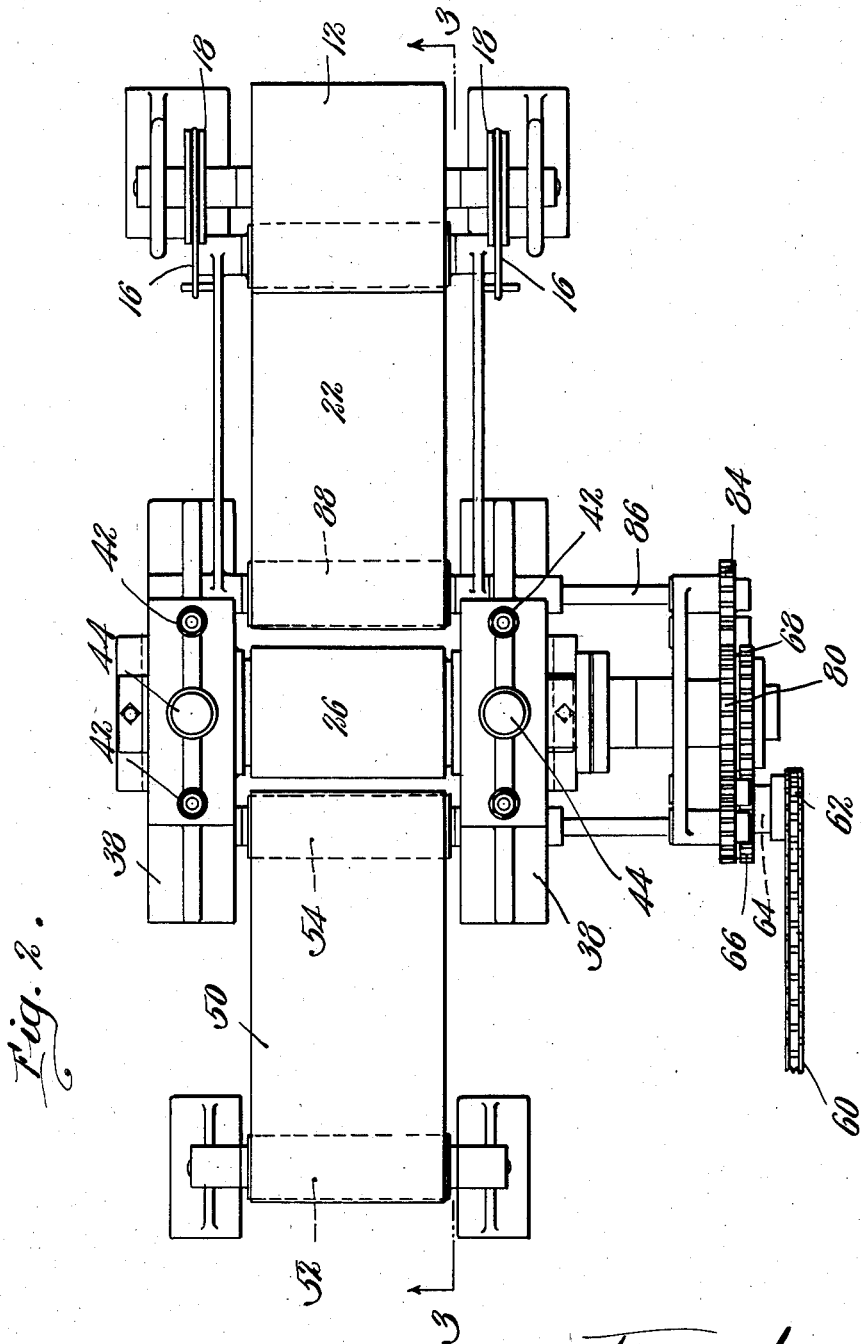

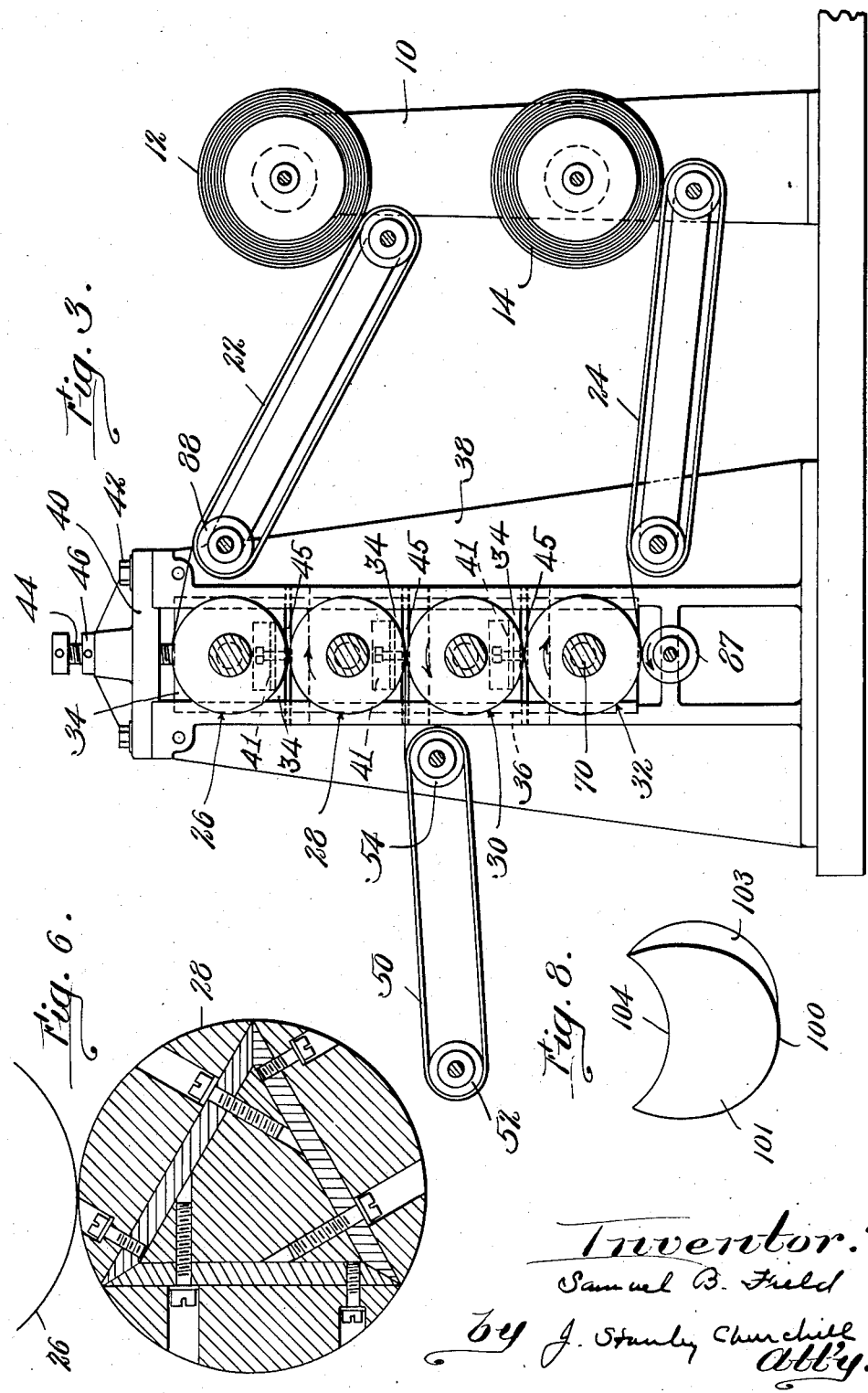

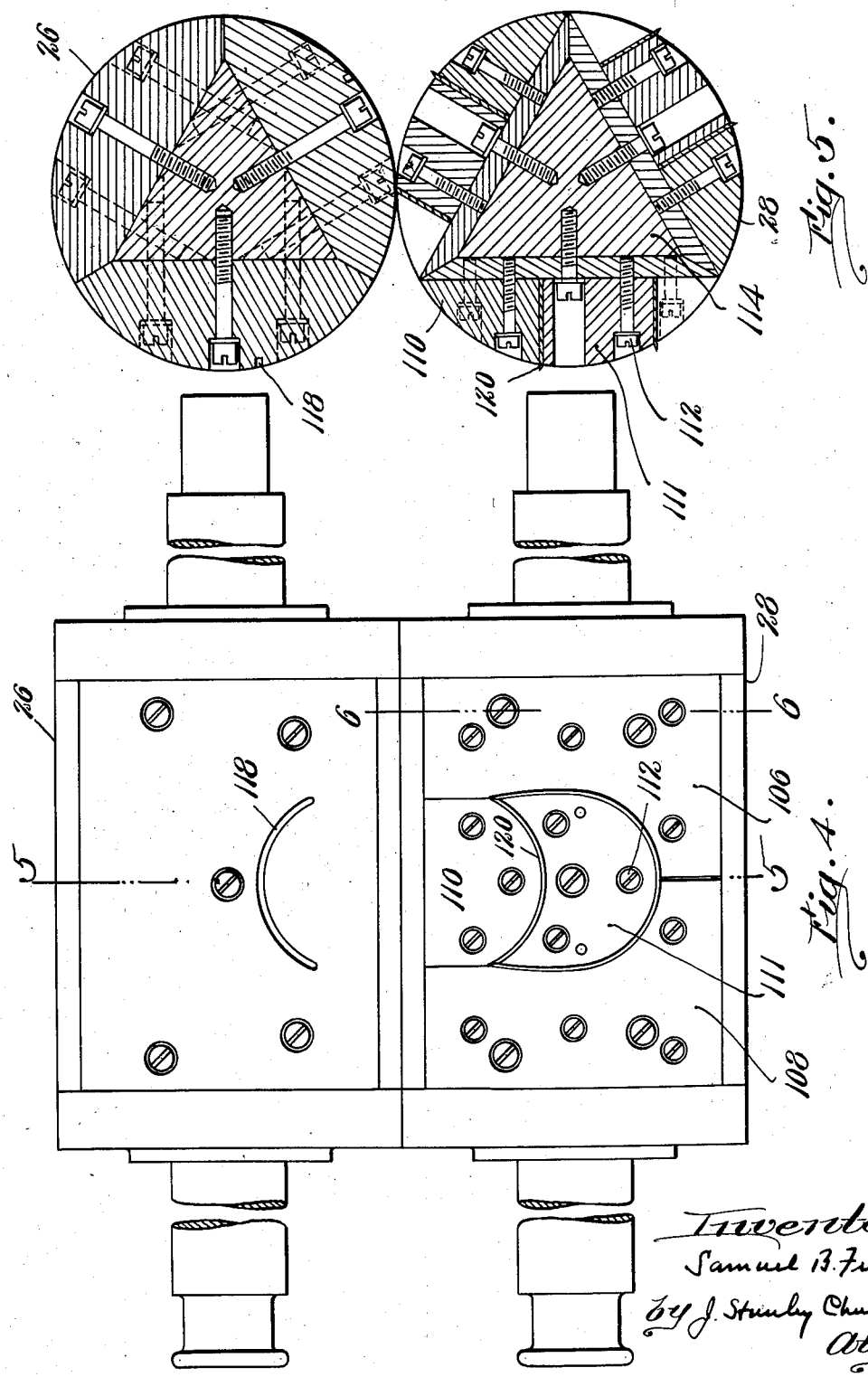

Patented Dec. 25, 1934

1,985,821

UNITED STATES PATENT OFFICE 1,985,821

MACHINE FOR FORMING RUBBER ARTICLES

Samuel B. Field, Holbrook, Mass., assignor to Archer Rubber Company, Milford, Mass., a corporation of Massachusetts Application October 6, 1932, Serial No. 636,527

3 Claims. (Cl. 164—28)

This invention relates to a machine for forming rubber articles from sheet rubber.

One object of the invention is to provide a novel and improved machine for forming rubber articles from uncured sheet rubber involving the automatic seaming of portions of the sheet rubber, and with which superior rubber articles may be more economically produced than has heretofore been possible with other machines of which I am aware.

Another object of the invention is to provide a novel and superior machine for forming rubber articles from uncured sheet rubber involving the cutting of the rubber article from sheet rubber and the seaming of portions of the sheet rubber, and which is capable of automatic operation to produce superior cut and seamed articles at minimum expense.

A further and more specific object of the invention is to provide an automatic machine for producing from uncured sheet rubber, rubber dress shields in a novel, improved and economical manner.

With these general objects in view, the invention consists in the machine and in the various structures, combinations and arrangements of parts hereinafter described and particularly defined in the claims at the end of this specification.

In the drawings I have illustrated the different features of the invention as embodied in a machine for producing rubber dress shields, and in which Fig. 1 represents a side elevation of the machine; Fig. 2 is a plan of the same; Fig. 3 is a vertical sectional view taken on the line 3—3 of Fig. 2; Fig. 4 is an enlarged detail of the two upper rolls which cooperate to perform a cutting operation upon the upper run of sheet rubber; Fig. 5 is a sectional view on the line 5—5 of Fig. 4; Fig. 6 is a detail on the line 6—6 of Fig. 4; Fig. 7 is an enlarged detail of the two lower rolls which cooperate to cut the lower rubber sheet; Fig. 8 is a perspective of one of the dress shields produced by the illustrated machine; and Fig. 9 is a sectional detail illustrating the combined seaming and cutting operation.

In the production of various rubber articles from uncured sheet rubber, it has heretofore been the practice to seam or join together portions of the uncured sheet rubber by pressure exerted upon such portions during the manual passage thereof between a pair of press rolls. Such operation has involved relatively high labor expense, and, accordingly, one feature of the invention contemplates the provision of an automatic machine for performing the seaming operation in joining together the portions of uncured sheet rubber in the production of various rubber articles.

Another feature of the invention contemplates a machine for cutting out rubber articles from uncured sheet rubber and performing a seaming operation thereon during the passage of the sheet rubber through the machine. In the illustrated embodiment of the invention, a machine is disclosed for cutting out two component members of a rubber dress shield from separate layers of sheet rubber fed into the machine and for seaming together one edge portion of the component parts to discharge from the machine the successive dress shields in a rapid, economical and practical manner ready to be subjected to the curing operations as now commonly practiced in the manufacture of such articles.

Referring now to the drawings, the machine therein disclosed includes a supporting standard 10 for operatively supporting two separate supply rolls 12, 14 of uncured sheet rubber. A friction drag comprising straps 16 running over pulleys 18 and weights 20 serve to maintain substantially uniform tension on the rubber sheeting as it is withdrawn from each roll and conducted into the machine by being passed over the supporting belts 22, 24 driven as will be described in timed relation to the operation of the operating rolls 26, 28, 30 and 32. As illustrated in Fig. 3, the rolls 26, 28, 30 and 32 are journalled in blocks 34 slidable in guideways 36 in standards 38 forming part of the machine frame, and the blocks and rolls are capable of being removably inserted into operative position by the removal of head pieces 40 secured by bolts 42 to the top of the standards 38. Screws 44 having lock nuts 46 are designed to engage the upper pair of blocks 34 to adjustably control the pressure and position of the various rolls, and the blocks 34 for the lower roll 32 are supported upon the bottom of the guideways 36, as shown in Fig. 3.

The machine is also provided with a discharge conveyor 50 comprising a belt running around supporting rolls 52, 54, the latter being driven in timed relation to the operation of the operating rolls 26, 28, 30, 32, as will be described.

Referring now to Fig. 1, the illustrated machine is designed to be driven from a motor, not shown, or other source of power, through a driving chain 60 running around a sprocket 62. The sprocket 62 is on the end of a counter shaft 64 upon the second end of which is provided a gear 66 meshing with a gear 68 on the end of a shaft 70 upon which the lower roll 32 is secured, so that the shaft 70 and roll 32 are positively rotated through the connections described. Provision is made for gearing together all of the operating rolls 26, 28, 30, 32, and to this end the shafts for the rolls are provided with gears 74, 76, 78, and 80 arranged as illustrated in Fig. 1, whereby all of the rolls are driven from the driven shaft 70 and in timed relation to one another. In order to drive the feed belts 22, 24, the upper feed belt 22 is driven through an idler gear 82 and gear 84 on the end of the shaft 86 upon which the upper roll 88 for the feed belt 22 is secured. The lower belt 24 is driven through a gear train including the gears 90, 92 and 94, the latter being upon the end of the shaft for the roll around which the belt 24 passes.

During the operation of the machine, the uncured sheet rubber is fed without stretching by the driven feed belts 22, 24, the upper sheet passing around the upper operating roll 26 and between it and the next lower operating roll 28 and around the latter, and thence between the operating roll 28 and the operating roll 30 and outwardly on the driven discharge conveyor 50. Similarly, the lower uncured rubber sheet is fed without stretching on the driven lower feed belt 24 and thence between an idler roll 87 and the lower operating roll 32 and around the latter, and between the operating rolls 32, 30 and around the latter, and thereafter between the operating rolls 30 and 28 and from which it is discharged from the machine by the driven discharge belt 50 with the upper rubber sheet superimposed thereon. In the manufacture of dress shields from the upper and lower uncured rubber sheets thus fed into the machine, provision is made for first cutting through each separate rubber sheet to form the outer curved edge 100 of each component member 101, 103 of the dress shield during passage of the upper and lower sheets between the cooperating pairs of rolls 26, 28, and 32, 30, respectively. Thereafter the sheet is caused to pass between the two central rolls 28, 30 where the operation of seaming and cutting the two previously cut component portions 101, 103 of each dress shield along the inner edge 104 is performed.

As herein shown, the cutting operation upon the upper sheet is performed by one of a series of cutting members 105 arranged to project slightly from the surface of the second roll 28. Each cutting member 105 preferably comprises a hardened thin steel blade having a suitable cutting edge and which is held in fixed relation to the roll by a series of segmental shaped blocks 106, 108, 110 whose outer surface forms the surface of the roll, and which are secured by a series of screws 112 to a central triangular shaped piece 114 comprising the core of the roll. The heads of the screws 112 are received within counter-sunk holes in the blocks, and the position of the screws are such as not to detract from the cutting operation performed by the cutting members 105. In order to permit cooperation of the projecting cutting edges from the cutting members 105 with the surface of the roll 26 as a bed or supporting roll, there is provided a series of arcuate grooves 118 in the surface of the roll 26, which are shaped to correspond to the arcuate projecting seaming and cutting member 120. The grooves 118 are so located in the surface of the roll 26 and are of such a size and depth that, as the rolls 26, 28 rotate, the projecting cutting edge of the member 120 passes into the groove, deflecting the rubber sheet between it and the bottom of the groove without effecting cutting of the rubber sheet. It will, therefore, be observed that in the operation of the machine, as the rubber sheet passes between the rolls 26, 28, the outer curved edge 100 of the component member 101 of the complete dress shield is cut.

Similarly, during the passage of the lower rubber sheet between the two lower rolls 30, 32, a similar outer curved edge 100 of the component members 103 of the dress shield are severed by a similar series of curved cutting members 130 secured in the roll 32 in a manner similar to the manner in which the cutting members 105 are secured in the roll 28. As the upper and lower rubber sheets pass between the two central rolls 28, 30, the inner arcuate cutting member 120 in cooperation with the roll 30 as a support operates to effect the seaming of the curved inner edges 104 of the two component members of each dress shield and also the cutting thereof to form the complete shield. For this purpose, the inner cutting member 120 is preferably shaped as illustrated in detail in Fig. 9, with a relatively flat pressing portion 140 arranged to cooperate with the roll 30 and exert sufficient pressure upon the two component portions of the dress shield to effect the desired seaming together of the inner edge 104 thereof. The rear side of the cutting member 120 is beveled at a relatively steep angle so that during the passage of the rubber sheets between the cutter 120 and the roll 30, the inner edge 104 of each shield forming portion is severed by the cutting edge 144, thus effecting the severance of the completely formed dress shield from the rubber sheet. After the dress shield has been thus severed from the sheet, it is carried along with the uncut portions of the rubber sheet onto a discharge belt 50, as illustrated in Fig. 3, to be delivered from the machine, and, in practice, an operator may separate each formed dress shield as it passes along the discharge belt 50.

As shown in Figs. 1 and 3 and in the illustrated machine, provision is made for removably supporting the supply rolls 12, 14 of the uncured sheet rubber in bearings in a supporting standard 10. In order to facilitate the rapid mounting of fresh supply rolls when those in the machine become exhausted, the machine is provided with an additional standard 13 having open bearings 15 in which such additional rolls may be supported in a position to permit the operator to rapidly assemble them in operative position in the standard 10. An important feature of the present machine resides in the driven feed belts 22, 24 which operate to convey the thin rubber sheeting into the machine without distortion and without stretching the same. It is extremely important that this be done in order that the successive cutting operations may be performed in predetermined register with one another.

In order to transmit the weight of the rolls 26, 28, 30 to the frame standards 38, and also to permit individual adjustment of these rolls vertically, as illustrated in Fig. 3, the boxes 34, in which the shafts for the individual rolls 26, 28, 30 are journalled, are preferably provided with angle plates 41 through which adjusting bolts 43 are screwed into engagement with angle plates 45 secured to the outer sides of the frame standards 38. In this manner individual adjustment of the several rolls 26, 28, 30 may be had by adjustment of the position of the adjusting bolts 43, and the weight of the individual rolls transmitted directly to the standards 38 comprising part of the machine, so that excessive pressure between the two lower rolls 30, 32 may be avoided.

Another important feature of the present invention resides in the construction of the rolls 26, 28, 30, 32 and in the manner of mounting the cutting members therein to permit the cutting members to be readily removed when it is desired to resharpen them or to introduce new cutting members.

The present invention, in its broader aspects, contemplates a machine adapted for the manufacture of various kinds of rubber articles of which dress shields are illustrative and in which cutting and seaming operations, or seaming operations alone, are to be performed. The present machine functions automatically to produce the rubber articles in a rapid, economical and efficient manner with minimum labor expense, and as a result the rubber articles may be produced at minimum manufacturing cost.

While the preferred embodiment of the invention has been herein illustrated and described, it will be understood that the invention may be embodied in other forms within the scope of the following claims.

Having thus described the invention, what is claimed is:—

1. In a machine of the character described, in combination, a frame, a set of four rolls mounted thereon, one of the two middle rolls being provided with a cutting member and also with a seaming member, the other middle roll being smooth, serving as a bed roll for the first middle roll, the end roll adjacent the first-mentioned middle roll being provided with a slot shaped to conform to and adapted to receive the seaming member upon the first middle roll, whereby to render the seaming member inoperative upon a rubber sheet passing between the first middle roll and its adjacent end roll, the second end roll adjacent the second middle roll being provided with a cutting member, and means for feeding separate sheets of rubber between each middle roll and its adjacent end roll, and thereafter between the middle rolls, whereby to effect the severance of the rubber articles from the sheets and the seaming together thereof.

2. In a machine of the character described, in combination, a frame, a set of four rolls mounted thereon, one of the two middle rolls being provided with a curved cutting member and also with a curved cutting and seaming member, the other middle roll being smooth, serving as a bed roll for the first middle roll, the end roll adjacent the first-mentioned middle roll being provided with a slot shaped to conform to and adapted to receive the curved cutting and seaming member upon the first middle roll, whereby to render the cutting and seaming member inoperative upon a rubber sheet passing between the first middle roll and its adjacent end roll, the second end roll adjacent the second middle roll being provided with a curved cutting member, and means for feeding separate sheets of rubber between each middle roll and its adjacent end roll, and thereafter between the middle rolls, whereby to effect the severance of the dress shields from the sheets and the seaming together of the two portions thereof.

3. In a machine of the character described, in combination, a frame provided with two vertically arranged guideways, a set of four rolls slidably mounted in said guideways, means for adjustably regulating the pressure between said rolls, one of the two middle rolls being provided with a cutting member and also with a seaming member, the other middle roll being smooth, serving as a bed roll for the first middle roll, the end roll adjacent the first-mentioned middle roll being provided with a slot shaped to conform to and adapted to receive the seaming member upon the first middle roll, whereby to render the seaming member inoperative upon a rubber sheet passing between the first middle roll and its adjacent end roll, the second end roll adjacent the second middle roll being provided with a cutting member, and means for feeding separate sheets of rubber between each middle roll and its adjacent end roll, and thereafter between the middle rolls, whereby to effect the severance of the rubber articles from the sheets and the seaming together thereof.

SAMUEL B. FIELD.